United States Patent
Galati et al.

(10) Patent No.: US 6,819,282 B1
(45) Date of Patent: Nov. 16, 2004

(54) SUPER-RESOLUTION PROCESSOR/RECEIVER TO DISCRIMINATE SUPERIMPOSED SECONDARY SURVEILLANCE RADAR (SSR) REPLIES AND SQUITTER

(75) Inventors: Gaspare Galati, Rome (IT); Mauro Leonardi, Rome (IT)

(73) Assignee: Universta' Degli Studi Di Roma "Tor Vergata", Rome (IT)

(*) Notice: Subject to any disclaimer, the term of this patent is extended or adjusted under 35 U.S.C. 154(b) by 0 days.

(21) Appl. No.: 10/473,333

(22) PCT Filed: Apr. 3, 2002

(86) PCT No.: PCT/IT02/00206
§ 371 (c)(1),
(2), (4) Date: Mar. 15, 2004

(87) PCT Pub. No.: WO02/082121
PCT Pub. Date: Oct. 17, 2002

(30) Foreign Application Priority Data

Apr. 3, 2001 (IT) .................................... RM2001A0176

(51) Int. Cl.[7] .......................... G01S 13/74; G01S 13/78
(52) U.S. Cl. .............................. 342/37; 342/29; 342/30; 342/32; 342/36; 342/40; 342/175; 342/195
(58) Field of Search ............................ 342/27–51, 159, 342/175, 192–197; 701/300–302

(56) References Cited

U.S. PATENT DOCUMENTS

| | | | | |
|---|---|---|---|---|
| 3,171,122 A | * | 2/1965 | Humpherys | 342/45 |
| 3,182,310 A | * | 5/1965 | Humpherys | 342/45 |
| 3,258,772 A | * | 6/1966 | Humpherys | 342/40 |
| 3,302,197 A | * | 1/1967 | Humpherys | 342/45 |
| 3,705,402 A | * | 12/1972 | Ballantyne et al. | 342/40 |
| 3,803,604 A | * | 4/1974 | Case | 342/30 |
| 3,849,777 A | * | 11/1974 | Shames et al. | 342/30 |
| 3,872,476 A | * | 3/1975 | Shames et al. | 342/40 |
| 3,887,916 A | * | 6/1975 | Goyer | 342/30 |
| 4,003,050 A | * | 1/1977 | Miller | 342/29 |
| 4,008,471 A | * | 2/1977 | Hall et al. | 342/30 |
| 4,070,673 A | * | 1/1978 | Schmidt et al. | 342/40 |
| 4,796,030 A | * | 1/1989 | Colotti et al. | 342/40 |
| 4,896,158 A | * | 1/1990 | Cole, Jr. | 342/40 |
| 5,063,386 A | * | 11/1991 | Bourdeau et al. | 342/40 |
| 5,081,457 A | * | 1/1992 | Motisher et al. | 342/40 |
| 5,089,822 A | | 2/1992 | Abaunza et al. | |
| 5,126,744 A | * | 6/1992 | Goedeke et al. | 342/40 |
| 5,321,406 A | * | 6/1994 | Bishop et al. | 342/32 |
| 5,367,303 A | * | 11/1994 | Waltz | 342/37 |
| 5,387,915 A | * | 2/1995 | Moussa et al. | 342/40 |
| 5,406,288 A | * | 4/1995 | Billaud et al. | 342/37 |
| 5,432,517 A | * | 7/1995 | Billaud et al. | 342/40 |
| 5,455,586 A | * | 10/1995 | Barbier et al. | 342/37 |
| 6,094,169 A | | 7/2000 | Smith et al. | |

* cited by examiner

Primary Examiner—Bernarr Earl Gregory
(74) Attorney, Agent, or Firm—Young & Thompson (57) ABSTRACT

A super resolution processor/receiver to discriminate superimposed secondary surveillance radar (Mode S, Mode A/C) replies and squitter that uses frequency-domain analysis to suppress interference between replies. In particular, the processor/receiver uses a spectral super-resolution method to estimate carriers of reply signals (every reply has a carrier that could be slightly different from the others). These frequency analyses, applied with particular timing referring to the signal that effectively carried the information, allow to estimate the information on SSR Mode S/Mode A/C replies.

19 Claims, 4 Drawing Sheets

SUPER-RESOLUTION PROCESSOR/ RECEIVER TO DISCRIMINATE SUPERIMPOSED SECONDARY SURVEILLANCE RADAR (SSR) REPLIES AND SQUITTER

FIELD OF THE INVENTION

This invention belongs to the field of Air Traffic Control and of Surveillance Systems. In particular it is applied in Cooperating Surveillance SSR (Secondary Surveillance Radar) Mode S and/or Mode A/C Systems and utilises "Mode S Squitter".

BACKGROUND OF THE INVENTION

Mode S squitter require that an aircraft emits Mode S replies spontaneous or on calling (replies to interrogations). These replies are generated from on board equipment called transponder. In this manner ground station (attive or passive) or others aircraft acquire positions and others information about the aircraft.

Present-day Mode S-Receivers decode replies if they do not suffer from interference with other replies. The Mode S replies can be decoded only if they are free from interference or at most, interfered with one Mode A/C reply. No Mode S reply with Mode S interference from other Mode S replies can be recognised and corrected, before the present invention.

SCOPE OF THE INVENTION

This invention goes beyond the present limitations in the capability to recognise and decode Mode S/Mode S interference by suitably using and analysing the replies and the spontaneous replies ("squitter") in the frequency domain besides the traditional processing in the time domain, the latter being the unique analysis used before this invention. The frequency analysis can be used because each transponder produce a central frequency (carrier frequency of the reply) that can be quite different from the others transponders due to the calibrations of the generator, inside a tolerance window defined by international regulations (ICAO standards). A sharp analysis (high resolution) of the frequencies allows the discrimination of superimposed replies that one cannot obtain with time analysis only.

Model based or "super resolution" methods allow a high-resolution frequency analysis. The present invention preferably uses an algorithm based on the paper of Tufts-Kumaresan, "Estimation of Frequencies of Multiple Sinusoids: Making Linear Prediction Perform Like Maximum Likelihood" Proceeding of IEEE, vol 70, no. 9, September 1982, pp. 975–981.

SUMMARY OF THE INVENTION

It is a specific object of the present invention a method for discriminating superimposed Secondary Surveillance Radar (SSR) replies in a digitalized received signal, a reply comprising a preamble and a data-block, the method being characterised in that it comprises the following step:

detecting a start time of one or more replies in said digitalized received signal, for each detected start time, determining an end time of the corresponding reply, generating time windows in at least a portion of the digitalized received signal, performing a spectrum super resolution method to the digitalized received signal in the generated time windows, in order to estimate one or more carrier frequencies in each generated time window, estimating the number of replies and the relative carrier frequencies in the digitalized received signal, and reconstructing said one or more replies.

Preferably according to the invention, said digitalized received signal comprises a Log(Sigma) component signal of a digitalized antenna signal.

Still according to the invention, the method may be characterised in that the steps of detecting a start time and determining an end time of one or more replies comprise an envelope detection of the digitalized received signal;

in that the time windows are generated in the whole signal and are partially superimposed;

in that the step of performing a spectrum super resolution method further estimate the number of carrier frequencies in each generated time window;

in that the step of estimating the number of replies and the relative carrier frequencies in the digitalized received signal is carried out through using the estimations obtained in the step of performing a spectrum super resolution method, wherein one or more power thresholds are created through which power in each generated time window is able to be associated with a pertaining reply; and in that the step of reconstructing said one or more replies estimates, for each reply in each generated time window, the presence and position of reply pulses through using said created one or more power thresholds, wherein the pertaining reply pulses are the ones having the carrier frequencies closest to estimated value, a signal being created for each reply, said signal being re-timed in such a way that the preamble is first re-timed and the data-block is re-timed afterward.

Always according to the invention, the method may be characterised in that the steps of detecting a start time of one or more replies and estimating the number of replies and the relative carrier frequencies in the digitalized received signal comprise the following sub-step estimating the arrival time of a leading reply, by using a power monitoring, detecting four preamble pulses, calculating the timing of the reply, through analysing the detected power levels and the timing of the detected pulses of the preamble, estimating the carrier frequency through performing a spectrum super resolution method onto said four preamble pulses, in order to obtaining a frequency evaluation for each of said four pulses, and averaging the four evaluations;

in that the time windows are generated according with the timing of the leading reply, corresponding to the chip time on which the pulses of the reply are detectable; and in that the step of reconstructing said one or more replies estimates comprises a first frequency testing, in order to verify in which of two temporal windows, related to a same bit of the reply, the frequency found for the leading reply is, through deciding for the time window wherein the same frequency of or the frequency value closest to the estimated frequency of the preamble is found.

Furthermore according to the invention, the sub-step of estimating the carrier frequency may perform a spectrum super resolution method wherein the signal in the pulses is represented by a number of complex sinusoids with unknown amplitudes and frequencies and white additive noise;

a linear prediction filter is defined and used to calculate the unknown parameters of the signal;

eigenvalues and eigenvectors are used to calculate the transfer function of the error prediction filter defined;

on the basis of the eigenvalues, a signal subspace and a noise subspace are defined with the related eigenvectors; and the zeros on the unitary circle of the filter transfer function, that correspond to the frequencies of the complex sinusoids, are calculated.

It is still an object of the present invention a Secondary Surveillance Radar (SSR) receiving and processing apparatus characterised in that it is adapted to carry out the aforementioned method for discriminating superimposed SSR replies in a digitalized received signal, the apparatus being further characterised in that it comprises:

means for detecting a start time of one or more replies in said digitalized received signal, said means receiving at an input said digitalized received signal;

means for determining, for each detected start time, an end time of the corresponding reply;

means for generating time windows in at least a portion of the digitalized received signal;

means for performing a spectrum super resolution method onto the digitalized received signal in the generated time windows, in order to estimate one or more carrier frequencies in each generated time window, said means receiving at a first input said digitalized received signal and being connected to said means for generating time windows;

means for estimating the number of replies and the relative carrier frequencies in the digitalized received signal, and means for reconstructing said one or more replies, such means being connected to said means for estimating the number of replies and the relative carrier frequencies.

Still according to the invention, the means for detecting a start time of one or more replies in said digitalized received signal may also receive an expected reply time.

Always according to the invention, the apparatus may be further characterised in that said means for detecting a start time of one or more replies in said digitalized received signal comprises envelope detecting means adapted to detect the start time, when signal power is higher than a threshold, and the end time of said one or more replies;

said means for estimating the number of replies and the relative carrier frequencies comprise carrier frequency estimating means for estimating, on the basis of the evaluation for each window, the number of replies and the relative carrier frequencies in the digitalized received signal and for creating one or more power thresholds; and said means for reconstructing said one or more replies comprise re-timing and reply reconstruction means for estimating, for each reply in each generated time window, the presence and position of reply pulses through using said created one or more thresholds, wherein the pertaining reply pulses are the ones having the carrier frequencies closest to estimated value, the re-timing and reply reconstruction means creating a signal for each reply and re-timing the same in such a way that the preamble is first re-timed and the data-block is re-timed afterward.

said re-timing and reply reconstruction means being connected to means for performing a spectrum super resolution method onto the digitalized received signal.

Still according to the invention, the apparatus may be further characterised in that said means for detecting a start time of one or more replies and said means for estimating the number of replies and the relative carrier frequencies in said digitalized received signal comprise preamble analysing means including preamble detecting means for estimating the arrival time of a leading reply, by using a power monitoring, and detecting four preamble pulses, start and end detecting means for calculating the timing of the reply, through analysing the detected power levels and the timing of the detected pulses of the preamble, said start and end detecting means being connected to said preamble detecting means, and carrier frequency estimating means for estimating the carrier frequency through performing a spectrum super resolution method onto said four preamble pulses, in order to obtaining a frequency evaluation for each of said four pulses, and averaging the four evaluations, said carrier frequency estimating means being connected to said preamble detecting means and to said start and end detecting means;

said means for reconstructing said one or more replies includes frequency testing means for verifying in which of two temporal windows, related to a same bit of the reply, the frequency found for the leading reply is, through deciding for the time window wherein the same frequency of or the frequency value closest to the estimated frequency of the preamble is found, said frequency testing means being connected to said carrier frequency estimating means, to said means for generating time windows and to said means for performing a spectrum super resolution method, and reply reconstruction means for reconstructing said one or more replies, said reply reconstruction means being connected to said frequency testing means.

According to the invention, it is provided a super resolution Processor/Receiver to discriminate superimposed Secondary Surveillance Radar (SSR) replies and squitter with the ability to discriminate and decode superimposed replies using both time and frequency analysis.

The Processor/Receiver may be characterised in that it utilises super resolution, that is exceeds the classic resolution limit (Raylegh limit) using non linear systems and model analysis.

The Processor/Receiver may still be characterised in that estimates the information about the replies carriers and estimate the replies timing using the time and frequency analysis with super resolution techniques of the whole (or part) of the signals coming from one or more replies.

The Processor/Receiver according to the invention may also be characterised in that it estimates the information about the carrier frequencies and timing using an analysis of the preamble of the leading reply with time and spectral super resolution techniques.

The Processor/Receiver according to the invention may furthermore be characterised in that it applies the super resolutions method to time windows where there is a useful signal.

The Processor/Receiver according to the invention may still be characterised in that it uses a super resolution method to study the information bit pulse's position.

The Processor/Receiver according to the invention may also be characterised in that it applies a super resolution method on the first and on the second part of interval related to each information's bit to estimate the position of the pulse.

The Processor/Receiver according to the invention may furthermore be characterised in that it uses a super resolution method applied in superimposed time sub windows on the interval in which power is detected.

The Processor/Receiver according to the invention may still be characterised in that it has a reply reconstructor.

The Processor/Receiver according to the invention may also be used for scopes different from Mode S reception. Namely, it can be used in all case in which the pulse coding is used and is necessary to discriminate superimposed signals, both for measurement (E.S.M. Electronic support measurements) or communications scopes.

BRIEF DESCRIPTION OF THE DRAWINGS

The foregoing aspects and other features of the invention are explained in the following description, taken in connection with the accompanying drawings, wherein.

In the figures, similar elements are indicated by the same reference numerals.

DETAILED DESCRIPTION

This invention describes an equipment that is composed by various elements.

Figure 1:
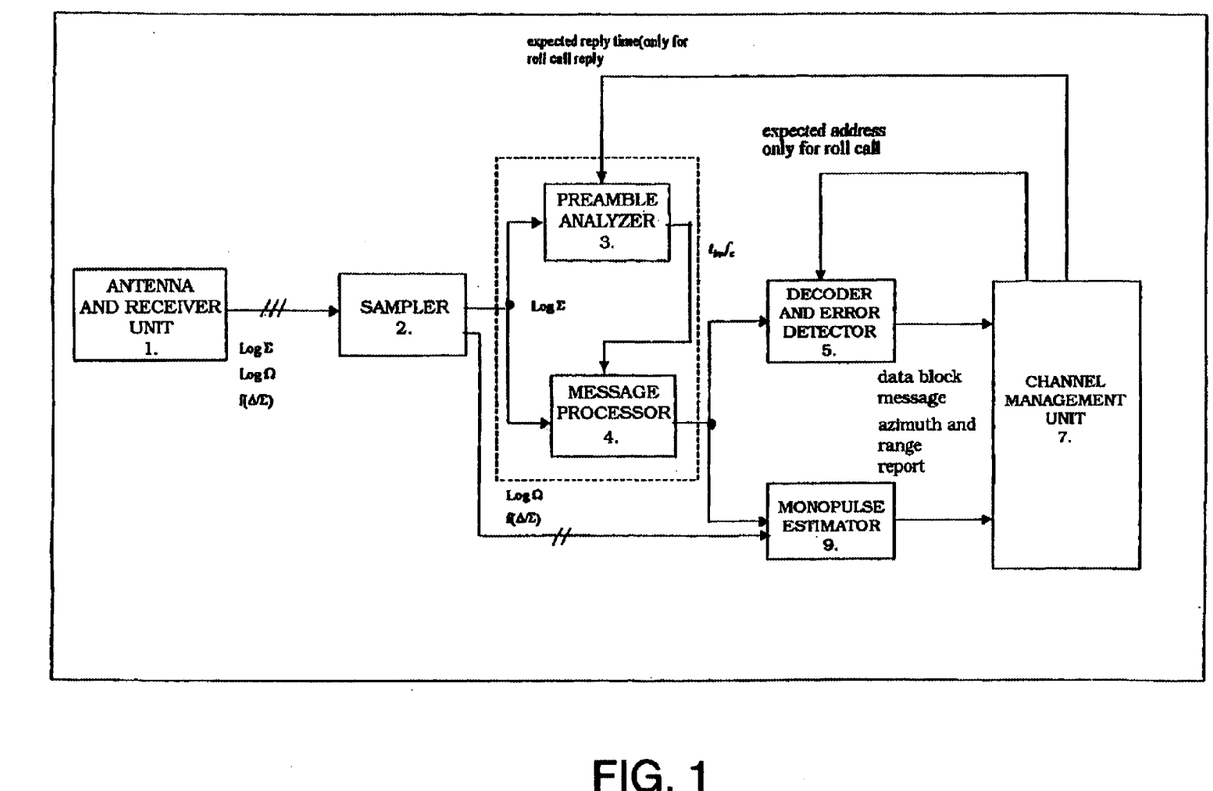
FIG. 1 is a schematic diagram of a first embodiment of a receiving and processing apparatus according to the invention.

A first embodiment of the apparatus according to the invention is shown in FIG. 1. The apparatus can work in the case of interfering Mode S replies (also more than 2 replies). The only requirement is that the preamble of the leading reply is received without superimposing pulses; in this condition the receiver can decode (with high probability) one of the superimposed replies (the leading).

With reference to FIG. 1, unit 1 comprises an antenna and an analog receiver adapted to operate in a SSR-Mode S equipment. The output of the antenna and receiver unit 1 is connected to the input of a sampler 2, which carries out a sampling of the video signal through digitalizing the signals coming from unit 1.

The output of the sampler 2 is connected to a preamble analyser 3 and to a super resolution message processor 4. The preamble analyser 3 analyses the signal received in input and detects the preamble, determining and the reply start-time $t_{in}$ and the carrier frequency $f_c$ of the preamble (reply) and outputting them towards the super resolution message processor 4. The processor 4 analyses the signal received from the sampler 2, discriminating pulses that belong to the reply-preamble using super-resolution techniques.

The output of the processor 4 is connected to a message decoding and error correcting unit 5 and to a monopulse estimator 6. Unit 5 outputs the reply information bits, while the estimator 6 outputs aircraft position data. In particular, the monopulse estimator 6 receives a further signal from the sampler 2 in order to estimate the aircraft position.

The outputs of the decoding and error correcting unit 5 and of the monopulse estimator 6 are connected to an aircraft tracking and communication channel management unit 7, which allows the initialisation and the update of the tracks corresponding to the aircrafts. In particular, unit 7 outputs an expected reply time (only for roll call reply) towards the preamble analyser 3 and an expected address (only for roll call reply) towards the decoding and error correcting unit 5.

Figure 2:
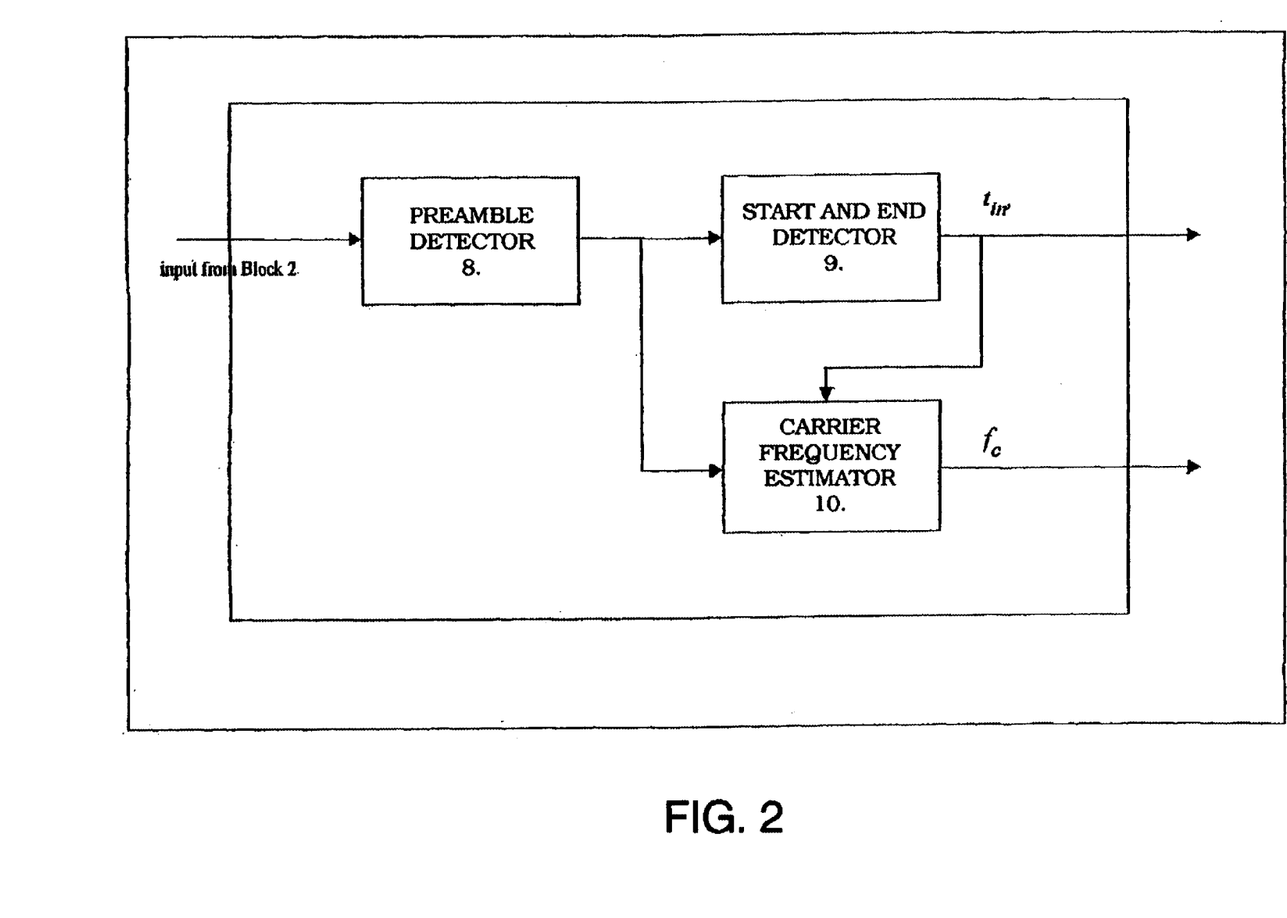
FIG. 2 is a schematic diagram of the preamble analyser of the apparatus of FIG. 1.

FIG. 2 shows a block diagram of the preamble analyser 3 of the apparatus of FIG. 1. A preamble detector 8 receives in input the signal coming from the sampler 2 and estimates the arrival time of the leading reply by using a power monitoring and detects the four preamble pulses. Furthermore, the preamble detector 8 verifies if the required timing is respected and calculates the timing of the reply. The preamble detector 8 preferably uses the method described by J. L. Gertz and V. A. Orlando in "SSR Improvements and collision avoidance systems panel SSR mode S system working group-1. Improved squitter reception update", SICASP/WG-1 WP/1/583, 2 June 1997.

The output of the preamble detector 8 is connected to both a start and end detector 9 and a carrier frequency estimator 10.

The start and end detector 9 calculates the reply timing and prevent false detection Particularly, it detects the reply timing (specifically the reply start time) analysing the detected power levels and the timing of the detected pulses of the preamble. The start and end detector 9 outputs the estimated reply timing also to the carrier frequency estimator 10.

The carrier frequency estimator 10 applies a spectrum super resolution method to the four preamble pulses, preferably 0.5 microseconds pulses, obtaining four frequencies valuations, one for each pulse. It then averages the four evaluations to obtain the estimate of the carrier frequency. The super resolution method is preferably based on the Tufts and Kumaresan algorithm described in the aforementioned paper. More preferably, the method uses a model where the signal in the pulses is represented by a number of complex sinusoids with unknown amplitudes and frequencies and white additive noise; a linear prediction filter is defined and used to calculate the unknown parameters of the signal. The method uses eigenvalues and eigenvectors to calculate the transfer function of the error prediction filter defined. Based on the eigenvalues two subspaces are defined: signal subspace and noise subspace with the related eigenvectors. Using only signal eigenvectors augments the resolution and the efficiency of the method. Finally, the method calculates the zeros on the unitary circle of the filter transfer function that correspond to the frequencies of the complex sinusoids.

Figure 3:
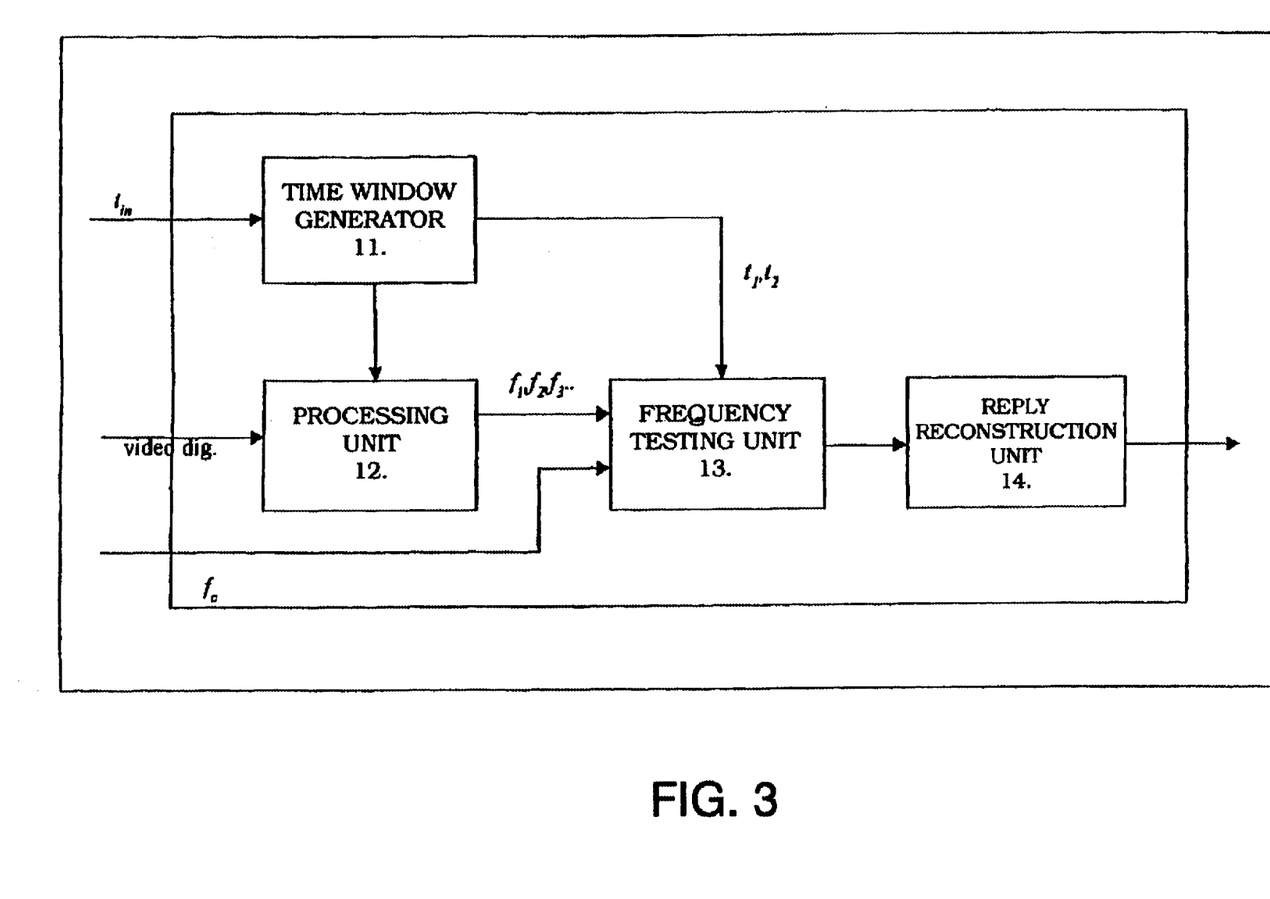
FIG. 3 is a schematic diagram of the super resolution message processor 4 of the apparatus of FIG. 1.

FIG. 3 shows a block diagram of the super resolution message processor 4 of the apparatus of FIG. 1. On the basis of the reply start-time $t_{in}$ received. from the preamble analyser 3, a time window generator 11 generates temporal windows according with the timing of the leading reply, corresponding to the chip time on which the pulses of the reply can be detected. Pulse position modulation is used in Mode S replies: two temporal windows are defined for each information bit, and a pulse shall be only in one of said temporal windows corresponding to the value of the bit.

The time window generator 11 is connected to a super resolution processing unit 12 that applies a super resolution method and estimates the carrier frequencies inside the temporal windows generated by the time window generator 11.

Both the time window generator 11 and the super resolution processing unit 12 are connected to a frequency testing unit 13, which also receives the carrier frequency $f_c$ of the preamble (reply) from the preamble analyser 3. The frequency testing unit 13 verifies in which of said temporal windows, related to the same bit, is the frequency found for the leading reply. In particular, the frequency testing unit 13 decides for the time interval wherein the same frequency of or the frequency value closest to the estimated frequency of the preamble is found.

The frequency testing unit 13 is in turn connected to a reply reconstruction unit 14 that reconstructs the replies using the information from the previous units. The used reconstruction method is preferably one of the method described in the aforementioned document by J. L. Gertz and V. A. Orlando.

In order to better understand the present invention, in the following the operation modes of the embodiment shown in FIGS. 1-3 are described, similar operation modes being valid also for other embodiments.

The antenna and receiver unit 1 carries out procedures comprising receiving from the antenna signals through two squinted mainlobes, and construction of three types of signals: log(Sigma), log(Delta) and f(Delta/Sigma) carried on an intermediate frequency. These signals are used to reach a fine target azimuth estimate through monopulse techniques. Said three signals are digitalized by the sampler 2.

The preamble analyser 3 uses the Log(Sigma) signal to detect the reply, while the monopulse estimator 6 uses log(Delta) and f(delta/Sigma) signals to estimate the azimuth. The preamble analyser 3 estimates the arrival time and the carrier of the reply, through using super resolution techniques. The super resolution message processor 4 uses these evaluations of the arrival time and the carrier of the reply.

The super resolution message processor 4 generates the time windows where the pulses of the message must be located (preferably according to international standard requirements). Mode S replies use a PPM modulations, consequently, on the basis of the start time of the replies it is possible to define two time windows for each bit of the message. The pulse related to a specific bit must be located in one of said two windows, according to the information bit. The carrier frequency estimator 10 carries out a frequency super resolution estimation method in said two windows in order to find the values of frequency in the two related windows for each bit. The method estimates both the position of the pulse, for the bit under consideration, and the window in which is found the carrier frequency of the reply (evaluated from the preamble analyser 3). In this way the full data block is estimated and the reply is reconstructed.

Another operation mode of the apparatus according to the invention comprises the detection of the pulses, preferably through estimating the envelope in the middle of the time windows, and performing the super resolution method only when the envelope is higher then a threshold in both the bit time intervals.

The reconstructed reply by the super resolution message processor 4 appears at the input of the message decoding and error correcting unit 5 and at the input of the monopulse estimator 6. Unit 5 decodes the reply, corrects errors and outputs the information bits included inside the reply. Estimator 6 calculates the monopulse estimate of azimuth and range and outputs such position information. Then, all the information coming from the reply, i.e. information bits and position information, is used by unit 7 to track and to manage all the target in the coverage area of the receiving and processing apparatus and to manage the whole air-ground-air communications.

Figure 4:
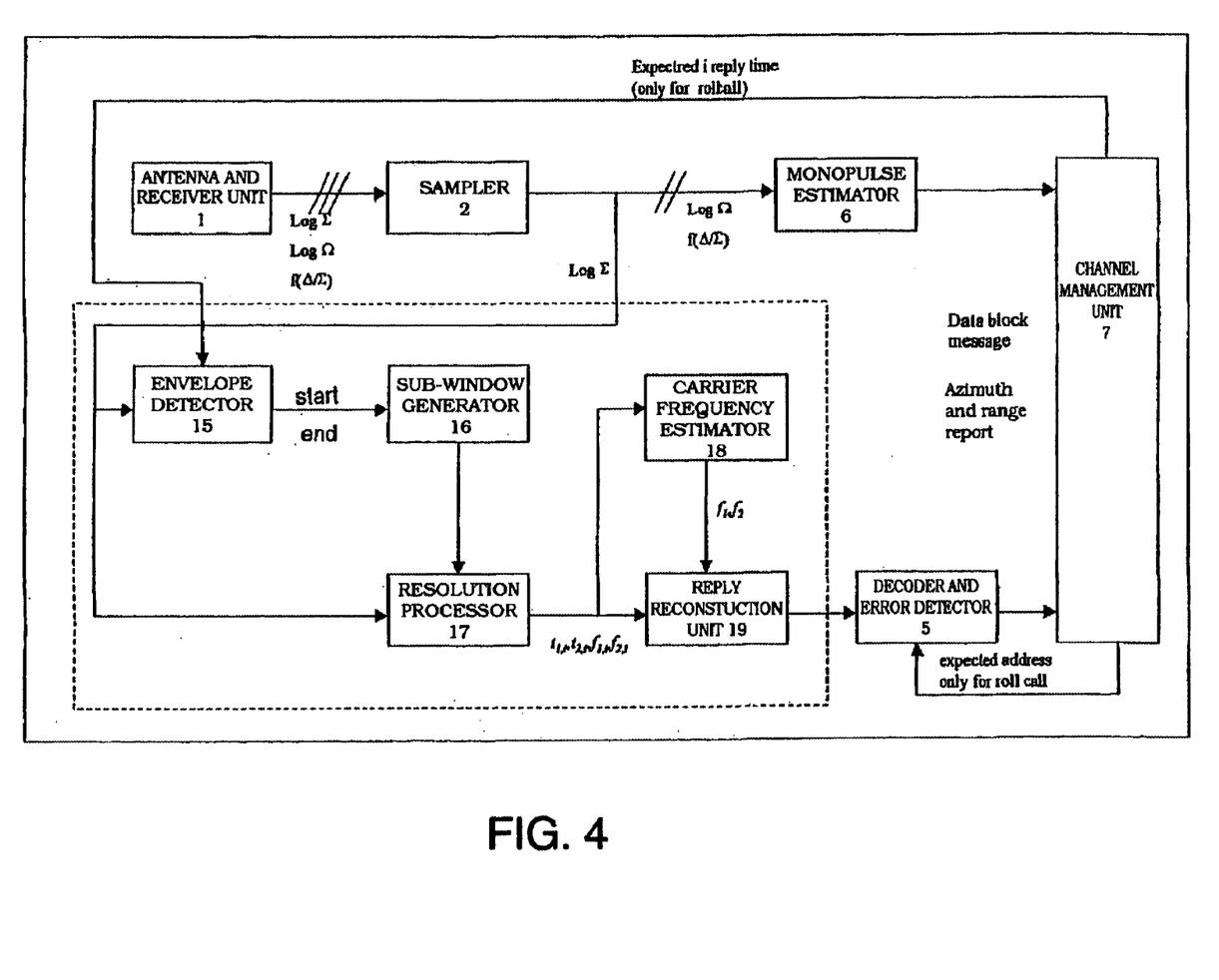
FIG. 4 is a schematic diagram of a second embodiment of a receiving and processing apparatus according to the invention.

A second embodiment of the apparatus according to the invention is shown in FIG. 4. Such second embodiment is more complex than the apparatus shown in FIGS. 1-3, but it allows to recognise both the interfering replies also in the case of superimposed preambles, that is wherein a second reply arrives before the end of the preamble of a leading reply. The apparatus of FIG. 4 operates without requiring the timing information (coming from a preamble analysis) and estimates the timing using the whole signals. Another important feature of the apparatus of FIG. 4 is that it estimates the number of interfering replies and the corresponding carrier frequencies, using the whole signal. Since the second embodiment still carries out a super resolution method, it may be considered as a generalisation of the first embodiment of FIGS. 1-3.

With reference to FIG. 4, an envelope detector 15 receives from the sampler 2 the Log(Sigma) signal. The envelope detector 15 detects the start time (when signal power higher than a threshold) and the end time of the reply or replies. Particularly, the envelope detector 15 has not to take account of the fluctuation due to the pulses of the replies. Specifically, in the case time intervals in which there is no significant signal power are too short, such time intervals are discarded. With respect to the apparatus of FIG. 1, the envelope detector 15 replaces the preamble detector 3.

The envelope detector 15 is connected to a sliding sub-window generator 16, which generates time windows partially superimposed within the time interval generated from the envelope detector 15. Preferably, time window length is 0.5 microseconds, and subsequent windows are superimposed each other for 0.25 microseconds. According to the invention, the smaller is the interval the higher is the performance. With respect to the apparatus of FIG. 1, the sliding sub-window generator 16 operates similarly as the time window generator 11, but the former does not use timing information and generates the windows in the whole signal.

The sliding sub-window generator 16 is connected to a super resolution processor 17, which receives also the Log (Sigma) signal from the sampler 2. The super resolution processor 17 carries out a super resolution method, preferably the aforementioned Tufts and Kumaresan algorithm, in the time windows generated by the sub-window generator 16 in order to estimate the carrier frequencies in each window. For each time window, the processor 17 outputs the number of carriers and the relative frequencies. With respect to the apparatus of FIG. 1, the super resolution processor 17 operates like the super resolution processing unit 12.

The super resolution processor 17 is connected to a carrier frequency estimator 18 and to a re-timing and reply reconstruction unit 19. On the basis of the evaluation for each sub-window, the carrier frequency estimator 18 estimates the total number of replies in the signal under test and the relative carrier frequencies (this is necessary since there is no estimate coming from the preamble). Considering the number of detected frequencies in each sub window and the relative carrier frequencies, the estimator 18 creates thresholds through which it is possible to associate the power in each sub window with the pertaining reply.

Using the threshold created by the carrier frequency estimator 18, the re-timing and reply reconstruction unit 19 for each reply estimates, in each sub-window, the presence and position of the pulses (the pertaining pulses are the ones having the carrier frequencies closest to estimated value). In this way the system creates two or more signals: one for each reply under test. These signals are then re-timed according to the international specifications. The preamble is firstly re-timed, since its form is known. Using the information coming from the re-timing of the preamble, the data-block is then re-timed.

In the following, the operation modes of the embodiment shown in FIG. 4 are described, similar operation modes being valid also for other embodiments.

After receiving and digitalizing of the signal through the antenna and receiver unit 1 and the sampler 2, respectively, the apparatus monitors the channel through the envelope detector 15. When a power level compatible with one or more SSR Mode S replies is detected, the remaining units are activated for processing the reply signal. The sliding sub-window generator 16 generates sub windows within the time interval wherein reply power is detected, in such a way that the super resolution method can be applied therein. The super resolution processor 17 applies the super resolution method on the signal coming from the sampler 2 in each sub window, in order to estimate the number of sinusoids and the relative frequencies. The carrier frequency estimator 18 uses all the informations (i.e., number of frequencies and frequency values) regarding the sinusoids belonging to each sub window to estimate the number of replies under test and their carrier frequencies. Using these evaluations the apparatus can handle each sub windows; henceforth it determines in which window there are reply pulses.

Having ascertained the presence of reply pulse(s) in a sub windows, the re-timing and reply reconstruction unit 19 is able to reconstruct the replies and then re-time the reply according to the international requirements. After the reconstruction of the reply, the apparatus is able to estimate range and azimuth, to decode the message and to correct the errors through the message decoding and error correcting unit 5 and the monopulse estimator 6. The aircraft tracking and communication channel management unit 7 generates tracks and manages communication between ground stations and aircrafts.

What is claimed is:

1. Method for discriminating superimposed Secondary Surveillance Radar (SSR) replies in a digitalized received signal, a reply comprising a preamble and a data-block, the method being characterised in that it comprises the following step:

detecting a start time of one or more replies in said digitalized received signal, for each detected start time, determining an end time of the corresponding reply, generating time windows in at least a portion of the digitalized received signal, performing a spectrum super resolution method to the digitalized received signal in the generated time windows, in order to estimate one or more carrier frequencies in each generated time window, estimating the number of replies and the relative carrier frequencies in the digitalized received signal, and reconstructing said one or more replies.

2. Method according to claim 1, characterised in that said digitalized received signal comprises a Log component signal of a digitalized antenna signal.

3. Method according to claim 1, characterised in that the steps of detecting a start time and determining an end time of one or more replies comprise an envelope detection of the digitalized received signal; in that the time windows are generated in the whole signal and are partially superimposed;

in that the step of performing a spectrum super resolution method further estimate the number of carrier frequencies in each generated time window;

in that the step of estimating the number of replies and the relative carrier frequencies in the digitalized received signal is carried out through using the estimations obtained in the step of performing a spectrum super resolution method, wherein one or more power thresholds are created through which power in each generated time window is able to be associated with a pertaining reply; and in that the step of reconstructing said one or more replies estimates, for each reply in each generated time window, the presence and position of reply pulses through using said created one or more power thresholds, wherein the pertaining reply pulses are the ones having the carrier frequencies closest to estimated value, a signal being created for each reply, said signal being re-timed in such a way that the preamble is first re-timed and the data-block is re-timed afterward.

4. Method according to claim 1, characterised in that the steps of detecting a start time of one or more replies and estimating the number of replies and the relative carrier frequencies in the digitalized received signal comprise the following sub-step estimating the arrival time of a leading reply, by using a power monitoring, detecting four preamble pulses, calculating the timing of the reply, through analysing the detected power levels and the timing of the detected pulses of the preamble, estimating the carrier frequency through performing a spectrum super resolution method onto said four preamble pulses, in order to obtaining a frequency evaluation for each of said four pulses, and averaging the four evaluations;

in that the time windows are generated according with the timing of the leading reply, corresponding to the chip time on which the pulses of the reply are detectable; and in that the step of reconstructing said one or more replies estimates comprises a first frequency testing, in order to verify in which of two temporal windows, related to a same bit of the reply, the frequency found for the leading reply is, through deciding for the time window wherein the same frequency of or the frequency value closest to the estimated frequency of the preamble is found.

5. Method according to claim 4, characterised in that the sub-step of estimating the carrier frequency performs a spectrum super resolution method wherein the signal in the pulses is represented by a number of complex sinusoids with unknown amplitudes and frequencies and white additive noise;

a linear prediction filter is defined and used to calculate the unknown parameters of the signal;

eigenvalues and eigenvectors are used to calculate the transfer function of the error prediction filter defined;

on the basis of the eigenvalues, a signal subspace and a noise subspace are defined with the related eigenvectors; and the zeros on the unitary circle of the filter transfer function, that correspond to the frequencies of the complex sinusoids, are calculated.

6. Secondary Surveillance Radar (SSR) receiving and processing apparatus characterised in that it is adapted to carry out the method for discriminating superimposed SSR replies in a digitalized received signal according to claim 1 the apparatus being further characterised in that it comprises:

means (3,15) for detecting a start time of one or more replies in said digitalized received signal, said means (3,15) receiving at an input said digitalized received signal;

means (11, 15) for determining, for each detected start time, an end time of the corresponding reply;

means (11, 16) for generating time windows in at least a portion of the digitalized received signal;

means (12,17) for performing a spectrum super resolution method onto the digitalized received signal in the generated time windows, in order to estimate one or more carrier frequencies in each generated time window, said means (12,17) receiving at a first input said digitalized received signal and being connected to said means (11,16) for generating time windows;

means (3,18) for estimating the number of replies and the relative carrier frequencies in the digitalized received signal, and means (4,19) for reconstructing said one or more replies, such means (4,19) being connected to said means (3,18) for estimating the number of replies and the relative carrier frequencies.

7. Apparatus according to claim 6, characterised in that means (3,15) for detecting a start time of one or more replies in said digitalized received signal also receives an expected reply time.

8. Apparatus according to claim 6, characterised in that it is adapted to carry out the method for discriminating superimposed SSR replies in a digitalized received signal, the apparatus being further characterised in that said means for detecting a start time of one or more replies in said digitalized received signal comprises envelope detecting means (15) adapted to detect the start time, when signal power is higher than a threshold, and the end time of said one or more replies;

said means for estimating the number of replies and the relative carrier frequencies comprise carrier frequency estimating means (18) for estimating, on the basis of the evaluation for each window, the number of replies and the relative carrier frequencies in the digitalized received signal and for creating one or more power thresholds; and said means for reconstructing said one or more replies comprise re-timing and reply reconstruction means (19) for estimating, for each reply in each generated time window, the presence and position of reply pulses through using said created one or more thresholds, wherein the pertaining reply pulses are the ones having the carrier frequencies closest to estimated value, the re-timing and reply reconstruction means (19) creating a signal for each reply and re-timing the same in such a way that the preamble is first re-timed and the data-block is re-timed afterward;

said re-timing and reply reconstruction means (19) being connected to means (12, 17) for performing a spectrum super resolution method onto the digitalized received signal.

9. Apparatus according to claim 6, characterised in that it is adapted to carry out the method for discriminating superimposed SSR replies in a digitalized received signal, the apparatus being further characterised in that said means for detecting a start time of one or more replies and said means for estimating the number of replies and the relative carrier frequencies in said digitalized received signal comprise preamble analysing means (3) including preamble detecting means (8) for estimating the arrival time of a leading reply, by using a power monitoring, and detecting four preamble pulses, start and end detecting means (9) for calculating the timing of the reply, through analysing the detected power levels and the timing of the detected pulses of the preamble, said start and end detecting means (9) being connected to said preamble detecting means (8), and carrier frequency estimating means (10) for estimating the carrier frequency through performing a spectrum super resolution method onto said four preamble pulses, in order to obtaining a frequency evaluation for each of said four pulses, and averaging the four evaluations, said carrier frequency estimating means (10) being connected to said preamble detecting means (8) and to said start and end detecting means (9);

said means (4) for reconstructing said one or more replies includes frequency testing means (13) for verifying in which of two temporal windows, related to a same bit of the reply, the frequency found for the leading reply is, through deciding for the time window wherein the same frequency of or the frequency value closest to the estimated frequency of the preamble is found, said frequency testing means (13) being connected to said carrier frequency estimating means (10), to said means (11, 16) for generating time windows and to said means (12,17) for performing a spectrum super resolution method, and reply reconstruction means (14) for reconstructing said one or more replies, said reply reconstruction means (14) being connected to said frequency testing means (13).

10. Super resolution Processor/Receiver to discriminate superimposed Secondary Surveillance Radar (SSR) replies and squitter, according to claim 6, with the ability to discriminate and decode superimposed replies using both time and frequency analysis.

11. Processor/Receiver according to claim 10 characterised in that it utilise super resolution, that is exceeds the classic resolution limit using non linear systems and model analysis.

12. Processor/Receiver according to claim 11 characterised in that estimates the information about the replies carriers and estimate the replies timing using the time and frequency analysis with super resolution techniques of the whole or part of the signals coming from one or more replies.

13. Processor/Receiver according to claim 12 characterised in that it estimates the information about the carrier frequencies and timing using an analysis of the preamble of the leading reply with time and spectral super resolution techniques.

14. Processor/Receiver according to claim 10 characterised in that it applies the super resolutions method to time windows where there is a useful signal.

15. Processor/Receiver according to claim 10 characterised in that it uses a super resolution method to study the information bit pulse's position.

16. Processor/Receiver according to claim 10 characterised in that it applies a super resolution method on the first and on the second part of interval related to each information's bit to estimate the position of the pulse.

17. Processor/Receiver according to claim 10 characterised in that it uses a super resolution method applied in superimposed time sub windows on the interval in which power is detected.

18. Processor/Receiver according to claim 10 characterised in that it has a reply reconstructor.

19. Processor/Receiver according to claim 10 used for scopes different from Mode S reception in which the pulse coding is used and is necessary to discriminate superimposed signals, both for measurement or communications scopes.

* * * * *